US011005589B2

(12) United States Patent
Revol et al.

(10) Patent No.: US 11,005,589 B2
(45) Date of Patent: May 11, 2021

(54) SYSTEM FOR DETECTING PERSONAL GNSS JAMMERS

(71) Applicant: THALES, Courbevoie (FR)

(72) Inventors: Marc Revol, Upie (FR); Jean-Guy Blete, Valence (FR)

(73) Assignee: THALES, Courbevoie (FR)

(*) Notice: Subject to any disclaimer, the term of this patent is extended or adjusted under 35 U.S.C. 154(b) by 192 days.

(21) Appl. No.: 15/892,328

(22) Filed: Feb. 8, 2018

(65) Prior Publication Data
US 2018/0234202 A1 Aug. 16, 2018

(30) Foreign Application Priority Data
Feb. 14, 2017 (FR) .................................... 1700161

(51) Int. Cl.
| | |
|---|---|
| *H04K 3/00* | (2006.01) |
| *G01S 19/21* | (2010.01) |
| *G01S 19/14* | (2010.01) |
| *G01S 7/02* | (2006.01) |
| *G01S 5/02* | (2010.01) |

(52) U.S. Cl.
CPC .............. *H04K 3/22* (2013.01); *G01S 7/022* (2013.01); *G01S 19/14* (2013.01); *G01S 19/21* (2013.01); *G01S 5/02* (2013.01); *H04K 3/90* (2013.01)

(58) Field of Classification Search
CPC .. H04K 3/22; H04K 3/90; G01S 7/022; G01S 19/14; G01S 19/21; G01S 5/02
USPC ............................................................ 342/16
See application file for complete search history.

(56) References Cited

U.S. PATENT DOCUMENTS

| | | | |
|---|---|---|---|
| 6,774,840 B1* | 8/2004 | Adamczyk ......... G08B 21/0269 342/357.31 |
| 8,217,836 B1* | 7/2012 | Anderson ............... G01S 13/86 342/417 |
| 2006/0087451 A1* | 4/2006 | Adamczyk ............. G08G 1/202 340/933 |
| 2006/0293854 A1* | 12/2006 | Chiou ................... G01S 13/904 701/301 |
| 2008/0303901 A1* | 12/2008 | Variyath .................. H04N 5/77 348/143 |
| 2010/0174486 A1* | 7/2010 | Wakabayashi ..... G01C 21/3407 701/472 |
| 2011/0148712 A1 | 6/2011 | Decabooter et al. |

(Continued)

FOREIGN PATENT DOCUMENTS

| | | |
|---|---|---|
| FR | 3 012 620 A1 | 5/2015 |
| FR | 3 012 621 A1 | 5/2015 |

(Continued)

*Primary Examiner* — Frank J McGue
(74) *Attorney, Agent, or Firm* — BakerHostetler

(57) ABSTRACT

A system for detecting GNSS signal jammers to be positioned on a roadside, the system comprises: a first device for receiving a GNSS signal; a second device that is configured to measure at least one characteristic of a received GNSS signal and to detect, on the basis of at least one characteristic, interference in the GNSS signal caused by a jamming signal; a third device for triggering the capture of an image of the road if the GNSS signal is subject to interference caused by a jamming signal, the first device configured to receive, via a radio link, a sequence of a satellite radionavigation signal received by a vehicle and retransmitted by the vehicle to the system via the radio link.

7 Claims, 2 Drawing Sheets

(56) References Cited

U.S. PATENT DOCUMENTS

2015/0264239 A1    9/2015   Petersen et al.
2016/0323048 A1    11/2016   Hisch

FOREIGN PATENT DOCUMENTS

FR     3 012 622 A1    5/2015
GB     2345136 A   *   6/2000  ............. G08G 1/127

* cited by examiner

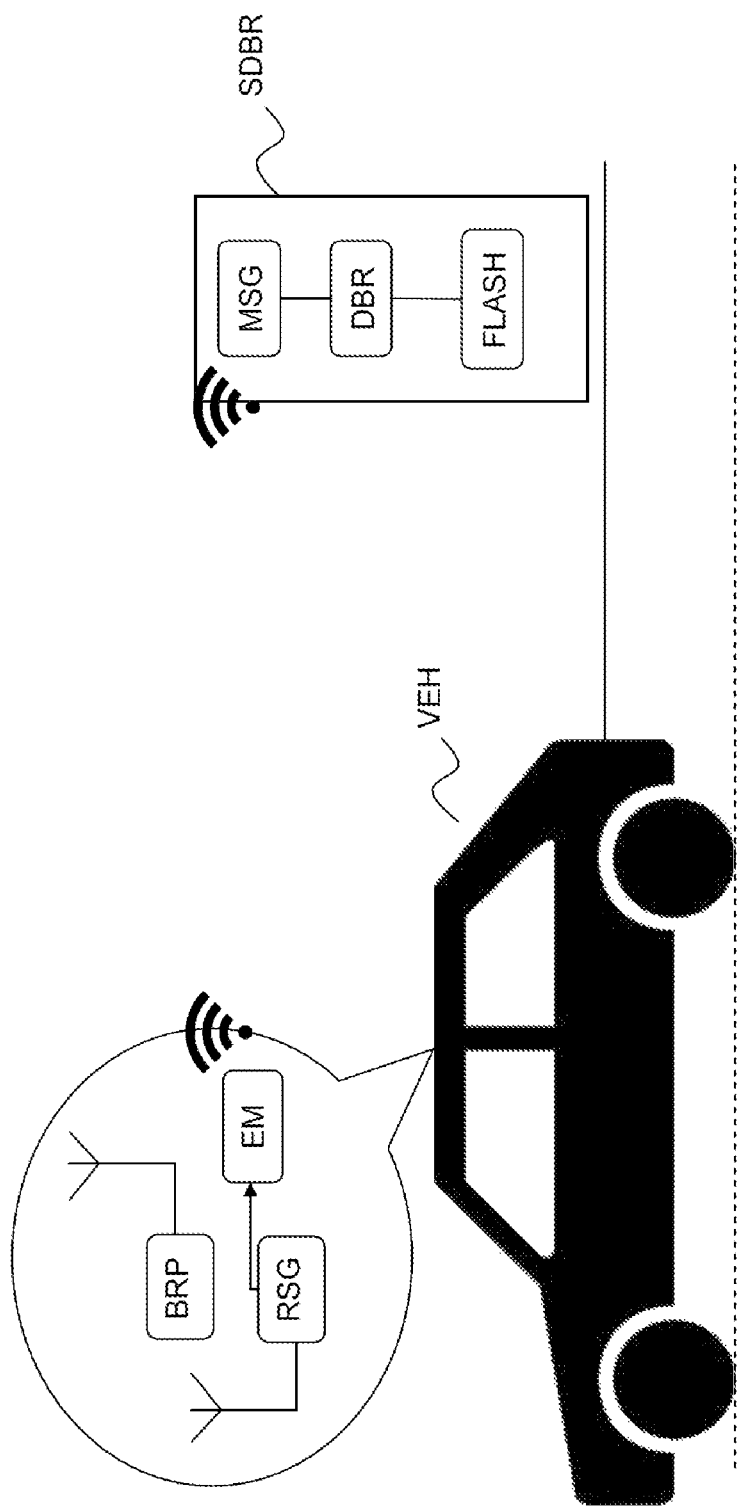

SYSTEM FOR DETECTING PERSONAL GNSS JAMMERS

CROSS-REFERENCE TO RELATED APPLICATIONS

This application claims priority to foreign French patent application No. FR 1700161, filed on Feb. 14, 2017, the disclosure of which is incorporated by reference in its entirety.

FIELD OF THE INVENTION

The invention relates to the field of systems for detecting GNSS jammers, in other words systems the purpose of which is to detect the transmission of a jamming signal the aim of which is to jam the reception of satellite radionavigation signals (GNSS signals).

More specifically, the invention relates to the detection of personal GNSS jammers used by motorists and lorry drivers to inhibit the geolocation of their vehicle. Specifically, certain professions, for example lorry or taxi drivers, or drivers of transport vehicles, are required to install a device on board the vehicle that geolocates the vehicle on the basis of received GNSS signals then transmits the position of the vehicle to a remote server. Although the geolocation of a vehicle is necessary during work hours, some drivers use personal GNSS signal jammers to inhibit the geolocation of their vehicle outside of work hours.

BACKGROUND

A GNSS signal jammer transmits a signal that interferes with the GNSS signals transmitted by satellites and therefore makes it impossible for them to be used by a GNSS receiver and hence for a position to be calculated.

A problem arises when a personal GNSS jammer is used by a driver in proximity to a sensitive location, such as a station or an airport. The use of this type of jammer is liable to interfere with the operation of location devices used in the infrastructure of these sensitive locations, when they are traversed by or located in proximity to routes used by vehicles employing such jammers.

Additionally, personal jammers may also interfere with GBAS (ground-based augmentation system) differential stations, which are positioned on the ground to assist GNSS systems and to improve their accuracy.

Although their use is forbidden, these jamming sources are very common and may constitute a danger that should be counteracted, not only by means of regulations but also by dedicated detection and location devices.

Furthermore, solving this type of problem may become critical in the future with the large-scale deployment of self-driving cars on the horizon.

One solution to the aforementioned problem consists in incorporating, within all GNSS receivers for road use, anti-jamming or jammer detection measures, however such a solution appears to be unsuitable due to the substantial impact in terms of implementational complexity on mobile receivers.

The invention proposes coupling vehicle speed camera posts with devices for detecting GNSS jammers to identify offenders.

The proposed solution has the advantage of making use of the existing automotive speed camera infrastructure to incorporate jamming detection systems therein to identify vehicles making use of personal jammers, in the same way that vehicles travelling over the speed limit are identified.

SUMMARY OF THE INVENTION

One subject of the invention is a system for detecting satellite radionavigation signal jammers, which is intended to be positioned on a roadside, the system comprising:

a first device for receiving a satellite radionavigation signal;

a second device that is configured to measure at least one characteristic of a received satellite radionavigation signal and to detect, on the basis of said at least one characteristic, interference in said satellite radionavigation signal caused by a jamming signal;

a third device for triggering the capture of an image of the road if said satellite radionavigation signal is subject to interference caused by a jamming signal, the first device being configured to receive, via a radio link, a sequence of a satellite radionavigation signal received by a vehicle and retransmitted by said vehicle to the system via the radio link.

According to one particular aspect of the invention, the sequence of a satellite radionavigation signal is taken at the output of the antenna of a satellite radionavigation receiver on board the vehicle.

According to one particular aspect of the invention, the first device is configured to receive, via a radio link, an identifier of said vehicle.

According to one particular aspect of the invention, the jamming signal is transmitted by said vehicle.

According to one particular variant, the system for detecting satellite radionavigation signal jammers according to the invention further comprises a device for locating a vehicle transmitting the jamming signal by detecting the direction of arrival of the jamming signal.

According to one particular aspect of the invention, said at least one characteristic of the satellite radionavigation signal is taken from: a signal-to-noise ratio after correlation, a power level of the signal after correlation, a shape of the correlation function of the signal.

Another subject of the invention is an automotive speed camera comprising a system for detecting satellite radionavigation signal jammers according to the invention.

BRIEF DESCRIPTION OF THE DRAWINGS

Other features and advantages of the present invention will become more clearly apparent upon reading the following description with reference to the appended drawings, which represent:

FIG. 2, a diagram of a system for detecting GNSS jammers according to one variant of the invention.

DETAILED DESCRIPTION

Figure 1:
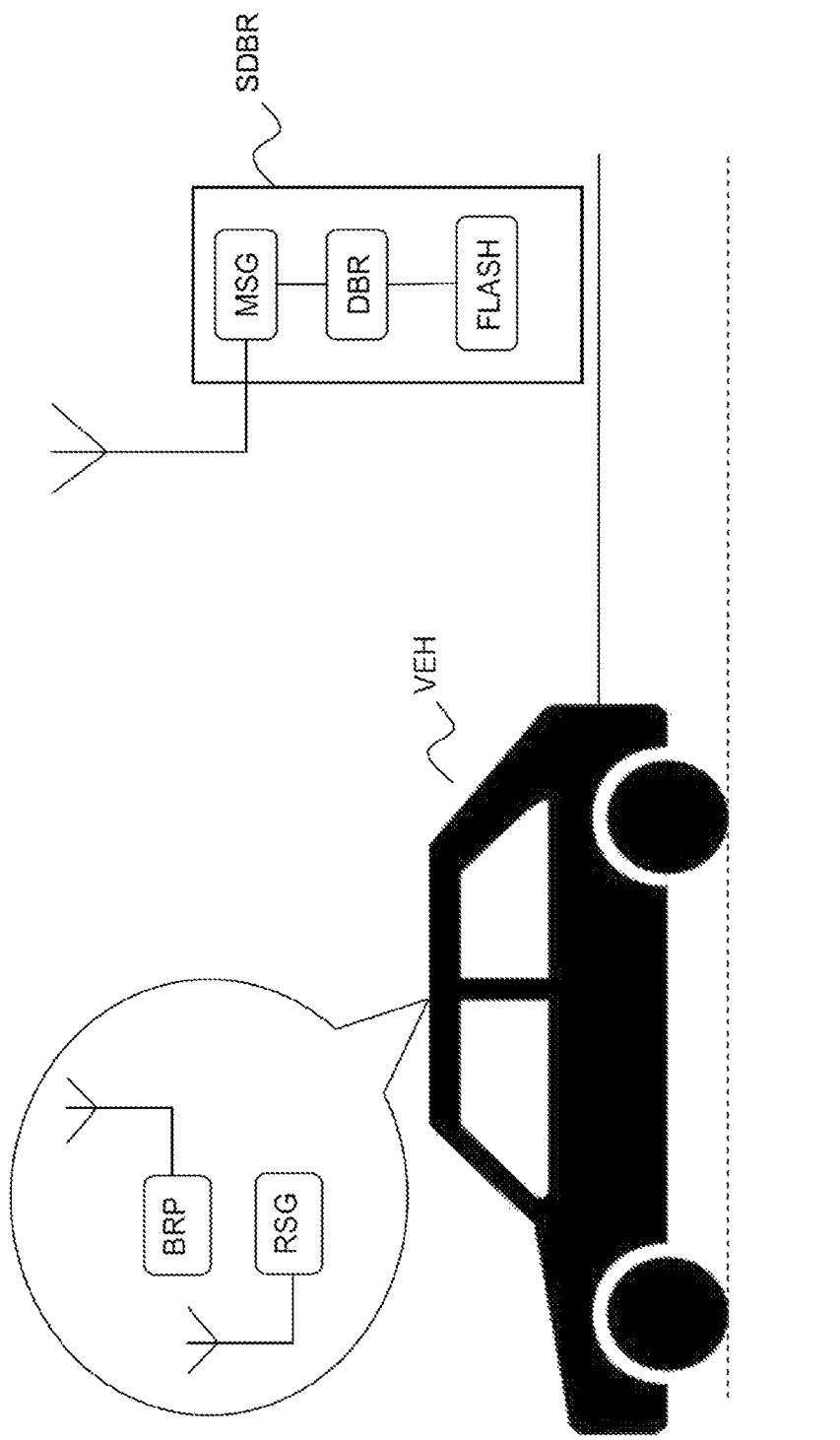
FIG. 1, a diagram of a system for detecting GNSS jammers according to the invention.

FIG. 1 illustrates, in the form of a diagram, the principle of a system for detecting GNSS jammers according to the invention. A vehicle VEH driving along a road is fitted with a GNSS signal receiver RSG, for example a GPS, GALILEO or GLONASS receiver. The driver of the vehicle VEH seeks to inhibit the reception of GNSS signals by the receiver RSG so as to avoid being geolocated. For this purpose, he or she uses a personal jammer BRP that is capable of transmitting a jamming signal that is superposed onto the GNSS signals to render them unusable by the receiver RSG.

However, the jamming signal transmitted by the personal jammer BRP may have a range such that it will interfere with the reception of GNSS signals beyond the immediate surroundings of the vehicle.

An objective of the invention is to detect and to identify the vehicle VEH from which the jamming signal is transmitted. To achieve this, the invention proposes a system for detecting jammers SDBR that is placed in a post positioned in proximity to a road, preferably in a sensitive area.

The system SDBR mainly comprises a first device MSG for receiving GNSS signals, a second device DBR for analysing the GNSS signals with a view to detecting the presence of a jamming signal and a third device FLASH for triggering the capture of an image of the vehicle VEH when a jamming signal is detected.

The first device MSG may consist of a simple device for measuring GNSS signals that receives the signals arising from the satellites in view and retransmits them to the second device DBR for analysis. The first device MSG and the second device DBR may also be located together within one and the same reception and analysis device.

The analysis device DBR is configured to analyse at least one characteristic of the received GNSS signal to detect interference in this GNSS signal caused by a jamming signal.

Various methods may be envisaged for performing this analysis.

A first possible method consists in measuring the signal-to-noise ratio of the GNSS signal after correlation. It will be recalled that a GNSS signal is modulated using a spreading code such that its level is lower than thermal noise. A GNSS receiver correlates the received signal with a local replica of the spreading code in particular to estimate the time of reception of the signal then information on position (by making use of multiple signals transmitted by multiple satellites). The signal obtained after correlation should normally have a high signal-to-noise ratio. However, if this signal has been interfered with by a jamming signal, the signal-to-noise ratio after correlation will be substantially lower than its expected level. Thus, by comparing the signal-to-noise ratio after correlation with a predetermined detection threshold, it is possible to detect an abnormal event which may be linked to the presence of a jamming signal.

Another possible method consists in analysing the power of the received signal and in particular its variations. This may be carried out by an automatic gain control device. An unusual variation in the level of the signal may signal the presence of a jammer.

Lastly, multiple methods are known for detecting a jamming signal based on an analysis of the shape of the correlation function of the signal. The correlation function is obtained by performing multiple correlations of the signal using the local spreading code offset by various delays. These methods are described in the French patent applications filed by the Applicant and published under the numbers FR 3012620, FR 3012621 and FR 3012622.

The correlation function may be calculated for multiple correlation points corresponding to different delays between the received signal and the local spreading code. For example, three different correlation points may be considered. The first point corresponds to a correlation of the signal in phase with the local spreading code, stated otherwise which gives the maximum possible value of the correlation. The second point corresponds to a correlation of the signal with the local spreading code advanced by a time offset T and the third point corresponds to a correlation of the signal with the local spreading code delayed by a time offset T. These three correlation points are typically used in a satellite radionavigation signal receiver to estimate the time offset between the signal received and the clock associated with the locally generated code. The advance and delay time offsets are smaller than the duration of a chip of the spreading code.

In the absence of interference, the shape of the correlation function corresponds substantially to an isosceles triangle as a function of the (advance or delay) time offset between the local code and the signal received. However, in the presence of a jamming signal, this shape is substantially modified.

The method proposed in patent application FR 3012620 consists in estimating the slope of the correlation function (on one of the sides of the isosceles triangle) then in comparing the value of this slope with a detection threshold that is configured as a function of a target signal-to-noise ratio.

The method proposed in patent application FR 3012621 uses, as a criterion for the presence of a jamming signal, information on intercorrelation between a first correlation measurement made for an "advance" offset and a second correlation measurement made for a "delay" offset, the two offsets being symmetrical with respect to the time abscissa of the maximum of the correlation function. The intercorrelation information is also compared with a predetermined detection threshold for identifying the presence of a jamming signal.

Lastly, patent application FR 3012622 proposes a method based on the use of multiple phase differences between two correlations performed at two successive temporal positions. The standard deviation of all of the phase differences is next calculated and compared with a detection threshold. In the presence of a jamming signal, this standard deviation is low since the phase of the jamming signal varies linearly with the delay. However, in the absence of interference, this standard deviation is high since the phase follows a random distribution.

The analysis device DBR may employ one or more of the methods described above. The use of multiple detection methods makes it possible to remove potential ambiguities linked to the fact that other sources of interference (which are not jammers) may potentially interfere with the reception of GNSS signals.

Without departing from the scope of the invention, any other method allowing the presence of a jamming signal to be detected by analysing one or more characteristics of the received GNSS signal may be envisaged instead of one or more of the methods described above.

When the device DBR detects the presence of a jammer, it immediately issues a command to the image capture device FLASH so that this device triggers the capture of an image of the vehicle VEH. The image capture device FLASH may comprise a camera coupled to a flash which illuminates the road so as to guarantee that the vehicle VEH is properly lit.

In one variant embodiment of the invention, the system SDBR may also comprise a device for locating the vehicle VEH transmitting the jamming signal by determining the direction of arrival of the jamming signal. Such a device may, for example, comprise a CRPA (controlled reception pattern array) antenna.

FIG. 2 schematically shows a variant embodiment of the invention. According to this variant, the GNSS signal receiver RSG on board the vehicle VEH is modified to retransmit the received GNSS signals to the post comprising the system SDBR according to the invention. To achieve this, the receiver RSG comprises or is coupled with a radio transmitter EM.

The system for detecting jamming signals SDBR is also modified in that the device for measuring GNSS signals MSG includes a radio receiver for receiving the radiofrequency RF signals output by the antenna arising from the vehicle VEH. Advantageously, the signal transmitted by the transmitter EM also includes an identifier of the vehicle VEH.

The device for detecting jamming signals DBR next analyses the signals arising from the vehicle VEH. One advantage of this variant is that it allows the vehicle transmitting the jamming signal to be accurately identified by analysing the transmitted identifier. Specifically, this variant of the invention makes it possible to identify, from a remote station, the GNSS signals received directly by a vehicle and retransmitted by the vehicle to the station. This approach makes it possible to be sure of the actual state of jamming in proximity to the vehicle rather than to the station. Since on-board jamming sources within a vehicle are generally of low power, the invention thus makes it possible to check for potential on-board jamming attempts within the vehicle.

Additionally, the GNSS signals retransmitted by the receiver RSG at the output of the antenna may be Galileo PRS signals which are naturally more robust when faced with jamming or spoofing than standard GPS C/A or Galileo OS GNSS signals. Since the authentication of Galileo PRS signals is guaranteed by the authorities, it functions as a stamp preventing all falsification of the signal and proving that the vehicle was at a given position on a given date.

The system SDBR according to the invention may be directly incorporated within an automotive speed camera. In this case, the image capture device FLASH used is that which is already available in the automotive speed camera. One advantage of this solution is that it does not require the deployment of new infrastructure and allows the speed camera posts that are already deployed in an area to be used and supplemented with the new functionality proposed by the invention.

In the different variant embodiments of the system SBDR according to the invention, the various components of the system may be arranged according to various architectures, in particular multiple components may be grouped together within one and the same device.

Each of the devices that includes the system according to the invention may be embodied in software and/or hardware form. Each device may in particular consist of a processor and a memory. The processor may be a generic processor, a specific processor, an application-specific integrated circuit (ASIC) or a field-programmable gate array (FPGA).

The invention claimed is:

1. A system for detecting satellite radionavigation signal jammers, the system being mountable on a roadside of a road, the system comprising:
   a first device configured for receiving, via a radio link, a sequence of a satellite radionavigation signal received by a vehicle and retransmitted by said vehicle to the system via the radio link;
   a second device that is configured for measuring at least one characteristic of the satellite radionavigation signal and to detect, on the basis of said at least one characteristic, interference in said satellite radionavigation signal caused by a jamming signal;
   a third device for triggering the capture of an image of the vehicle on the road if said satellite radionavigation signal is subject to interference caused by the jamming signal.

2. The system for detecting satellite radionavigation signal jammers according to claim 1, wherein the sequence of the satellite radionavigation signal is captured at the output of the antenna of a satellite radionavigation receiver on board the vehicle.

3. The system for detecting satellite radionavigation signal jammers according to claim 1, wherein the first device is configured for receiving, via a radio link, an identifier of said vehicle.

4. The system for detecting satellite radionavigation signal jammers according to claim 1, wherein the jamming signal is transmitted by said vehicle.

5. The system for detecting satellite radionavigation signal jammers according to claim 1, further comprising a device for locating a vehicle transmitting the jamming signal by detecting the direction of arrival of the jamming signal.

6. The system for detecting satellite radionavigation signal jammers according to claim 1, wherein said at least one characteristic of the satellite radionavigation signal is selected among: a signal-to-noise ratio after correlation, a power level of the signal after correlation, a shape of the correlation function of the signal.

7. An automotive speed camera comprising a system for detecting satellite radionavigation signal jammers according to claim 1.

* * * * *